United States Patent
Malkosh

(10) Patent No.: US 10,613,710 B2
(45) Date of Patent: Apr. 7, 2020

(54) PRODUCT SIMULATION AND CONTROL SYSTEM FOR USER NAVIGATION AND INTERACTION

(71) Applicant: SWATCHBOOK, Inc., Laguna Niguel, CA (US)

(72) Inventor: Yazan W. Malkosh, Laguna Niguel, CA (US)

(73) Assignee: SWATCHBOOK, Inc., Irvine, CA (US)

( * ) Notice: Subject to any disclaimer, the term of this patent is extended or adjusted under 35 U.S.C. 154(b) by 169 days.

(21) Appl. No.: 15/848,598

(22) Filed: Dec. 20, 2017

(65) Prior Publication Data

US 2019/0121499 A1  Apr. 25, 2019

Related U.S. Application Data

(60) Provisional application No. 62/575,481, filed on Oct. 22, 2017.

(51) Int. Cl.

| | |
|---|---|
| *G06F 3/048* | (2013.01) |
| *G06F 3/0482* | (2013.01) |
| *G06F 3/0485* | (2013.01) |
| *G06F 3/0488* | (2013.01) |
| *G06T 19/20* | (2011.01) |

(Continued)

(52) U.S. Cl.
CPC .......... *G06F 3/0482* (2013.01); *G06F 3/0485* (2013.01); *G06F 3/04883* (2013.01); *G06Q 10/04* (2013.01); *G06Q 30/0603* (2013.01); *G06Q 30/0643* (2013.01); *G06T 19/20* (2013.01); *G06F 3/0483* (2013.01);

(Continued)

(58) Field of Classification Search
CPC .. G06F 3/0482; G06F 3/0485; G06F 3/04883; G06F 2217/16; G06F 17/5009; G06F 17/50; G06F 2217/04; G06F 2217/32
See application file for complete search history.

(56) References Cited

U.S. PATENT DOCUMENTS

| | | | |
|---|---|---|---|
| 6,005,969 A | 12/1999 | Thomas et al. | |
| 6,404,426 B1 | 6/2002 | Weaver | |

(Continued)

FOREIGN PATENT DOCUMENTS

EP  1452985 B1  12/2010

OTHER PUBLICATIONS

Veronese, "Tutorial: Creating fabric with VRscans", 30 total [May 19, 2017]. Retrieved on Dec. 15, 2018.Retrieved from the internet <URL: https://3dtotal.com/tutorials/Ututorial-creating-fabric-with-vrscans-luca-veronese-tutorial-3d-vfx-vr#article-step-1-scene-set-up-in-3ds-max> entire document.

*Primary Examiner* — Nicholas Augustine
(74) *Attorney, Agent, or Firm* — Olav M. Underdal; IDP Patent Services

(57) ABSTRACT

A product simulation and control system includes: a server, including a product storage; and a device, including a processor, non-transitory memory, input/output, product browser, product simulator that simulates physical movement of products, and a product classifier that uses machine learning to optimize a product classification function. Also disclosed is a method for product simulation and control, including browsing, favoriting, tagging, selecting, page browsing, pinching, stretching, and simulating movement of products.

25 Claims, 13 Drawing Sheets

(51) Int. Cl.
  *G06Q 10/04* (2012.01)
  *G06Q 30/06* (2012.01)
  *G06F 3/01* (2006.01)
  *G06T 15/80* (2011.01)
  *G06F 3/0483* (2013.01)

(52) U.S. Cl.
  CPC .......... *G06T 15/80* (2013.01); *G06T 2200/24* (2013.01); *G06T 2210/16* (2013.01); *G06T 2219/2016* (2013.01)

(56) References Cited

U.S. PATENT DOCUMENTS

| | | | |
|---|---|---|---|
| 6,473,671 B1 | 10/2002 | Yan | |
| 7,663,648 B1 | 2/2010 | Saldanha et al. | |
| 8,005,655 B2 | 8/2011 | Baker et al. | |
| 8,577,650 B2 | 11/2013 | Baker et al. | |
| 9,679,409 B2 | 6/2017 | Black et al. | |
| 9,773,274 B2 | 9/2017 | Curry et al. | |
| 9,811,854 B2 | 11/2017 | Lucido | |
| 2010/0070246 A1 | 3/2010 | Choi | |
| 2011/0148871 A1 | 6/2011 | Kim et al. | |
| 2013/0118736 A1* | 5/2013 | Usadi | G06F 17/5018 166/268 |
| 2013/0151382 A1 | 6/2013 | Fuller | |
| 2013/0314410 A1 | 11/2013 | Gravois et al. | |
| 2014/0189577 A1 | 7/2014 | Shuttleworth et al. | |
| 2015/0055085 A1* | 2/2015 | Fonte | B29D 12/02 351/178 |
| 2015/0106241 A1 | 4/2015 | Lucido | |
| 2015/0154691 A1 | 6/2015 | Curry et al. | |
| 2016/0180449 A1* | 6/2016 | Naware | G06Q 30/0643 705/27.2 |
| 2016/0292915 A1 | 10/2016 | Chhugani et al. | |
| 2017/0004567 A1 | 1/2017 | Dutt et al. | |
| 2017/0046769 A1 | 2/2017 | Jackson et al. | |
| 2017/0161948 A1 | 6/2017 | Hua et al. | |
| 2017/0300598 A1* | 10/2017 | Akavia | G06Q 50/04 |
| 2017/0372504 A1 | 12/2017 | Jang | |
| 2018/0005312 A1* | 1/2018 | Mattingly | G06F 3/011 |
| 2018/0188415 A1* | 7/2018 | Imhof | G01V 99/005 |

\* cited by examiner

Product Simulation and Control Server

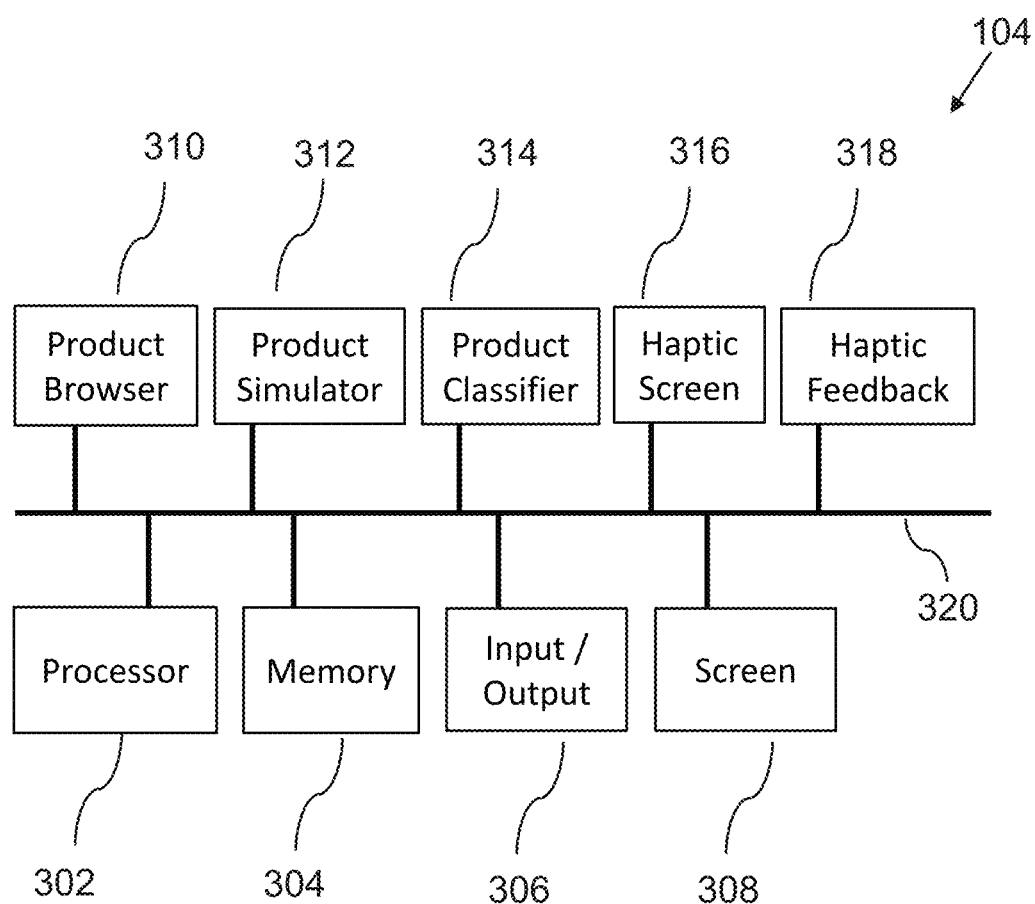

FIG. 4A
Roll View
FIG. 4B
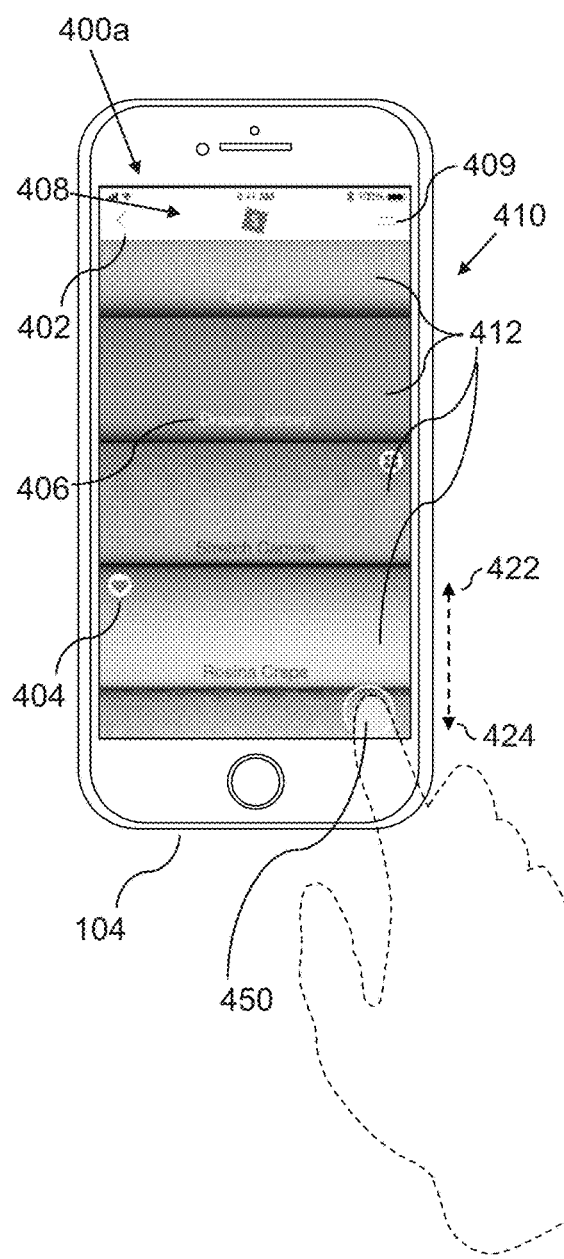
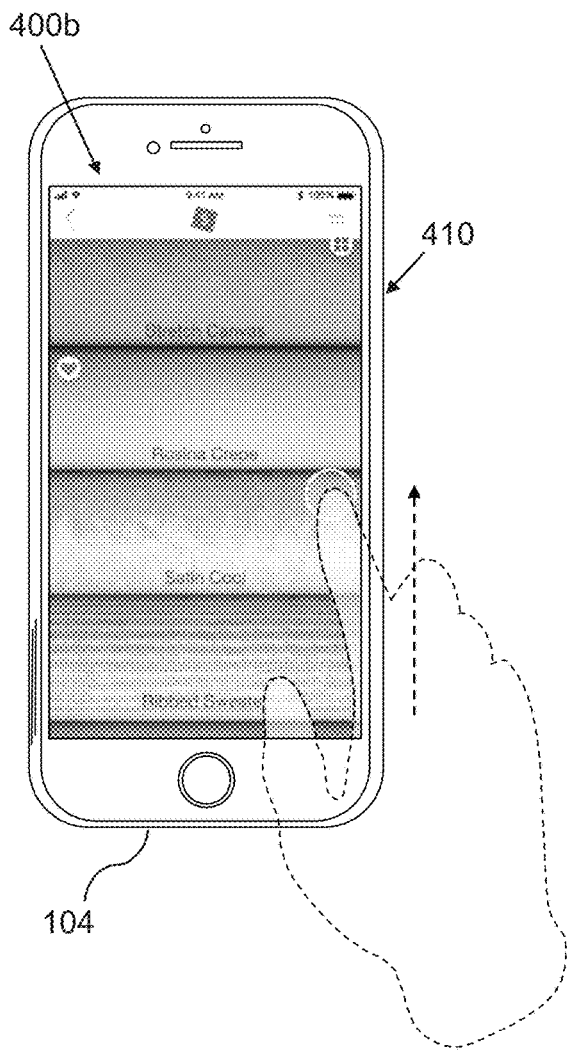

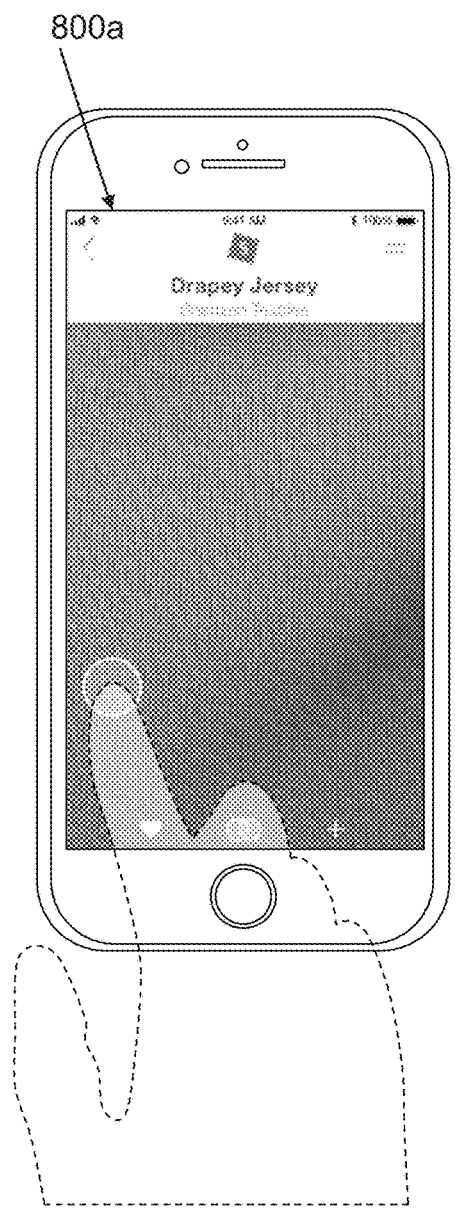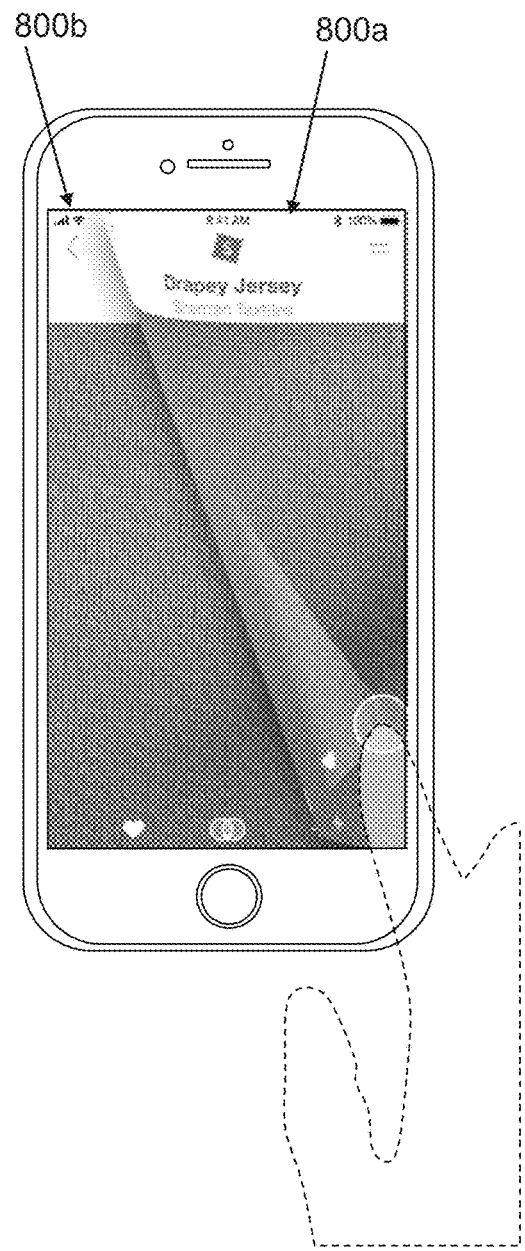

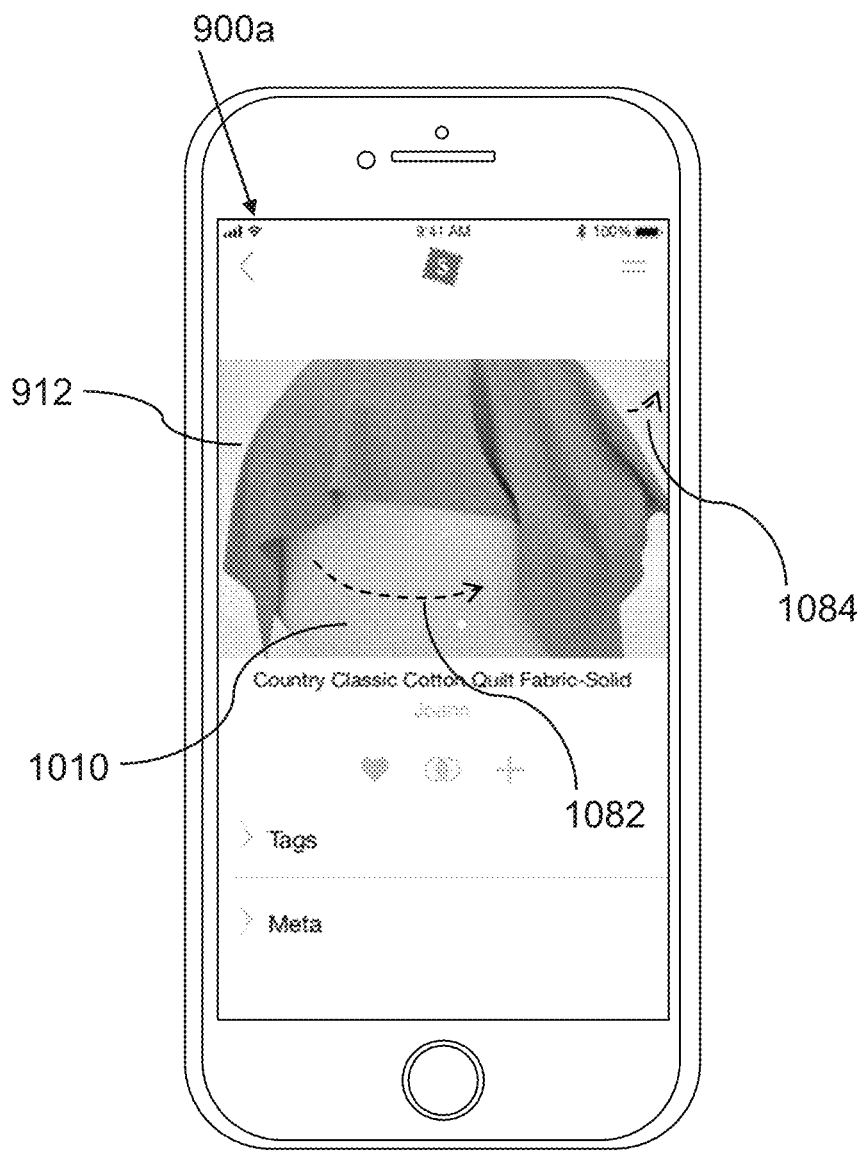

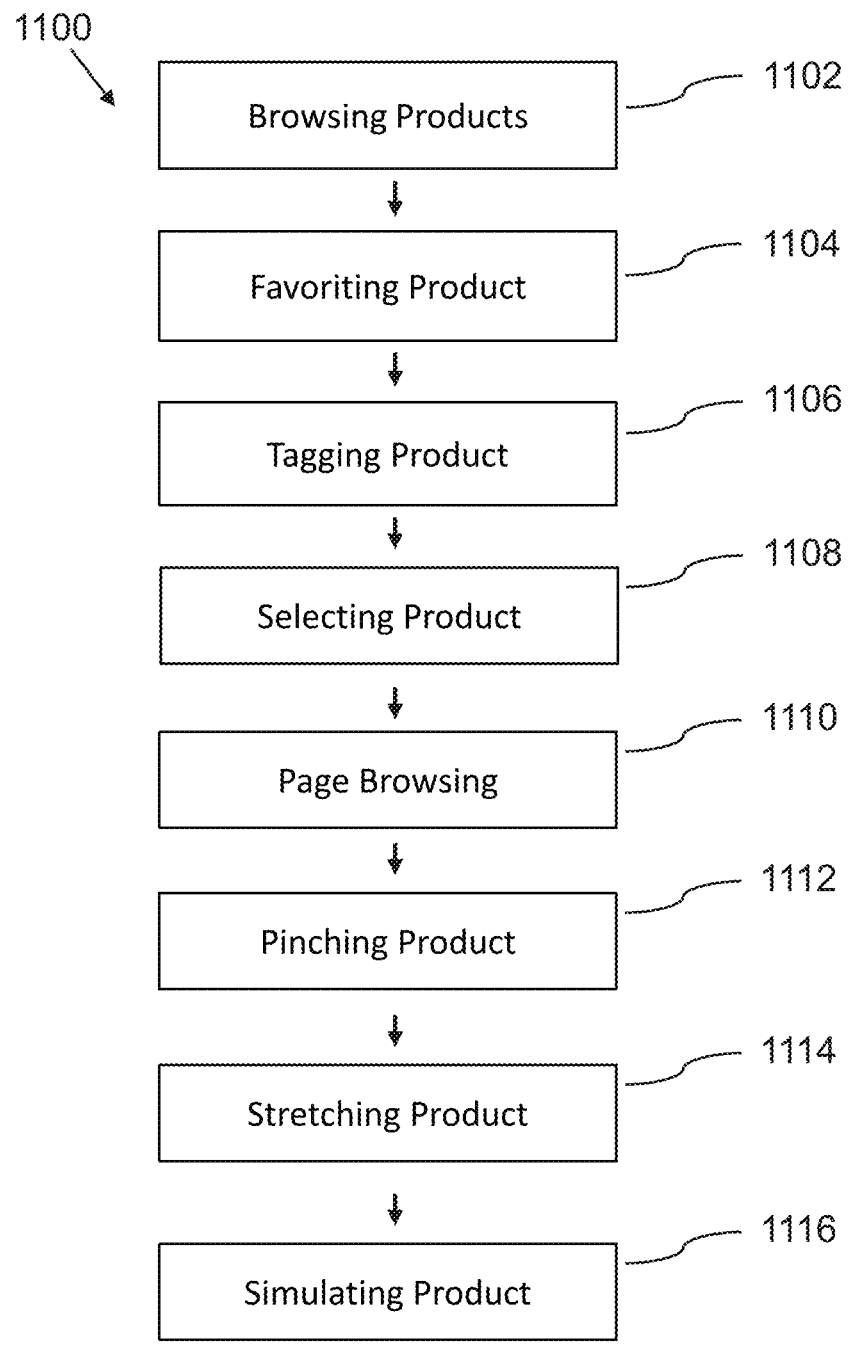

PRODUCT SIMULATION AND CONTROL SYSTEM FOR USER NAVIGATION AND INTERACTION

CROSS-REFERENCE TO RELATED APPLICATIONS

This application claims the benefit of U.S. Provisional Application No. 62/575,481, filed Oct. 22, 2017, which is hereby included herein by reference in its entirety.

FIELD OF THE INVENTION

The present invention relates generally to the field of sample presentation of manufactured materials, such as fabrics, thread, wires, and metals, and more particularly to methods and systems for presenting digital representations of materials via methods of physical simulation.

BACKGROUND OF THE INVENTION

Traditional methods in the manufacturing industries rely on material manufacturers sending physical samples to finished goods manufacturers for inspection prior to order materials for manufacturing. For example, fabric manufacturers or wholesalers may send fabric swatches or strike offs to buyers representing clothing manufacturers, in order to allow the buyers to inspect the physical characteristics of the fabrics they are interested in. Such swatch samples may be sent in a collection, often called a sample book or swatch book.

However, this method is time consuming and adds to the cost and production cycle length. As an example, manufacturers and wholesalers have tried to use online methods of presenting materials for sale online. However, such methods are not able to adequately display the precise characteristics of the products for sale, and as such cannot reliably replace the use of physical swatch books.

As such, considering the foregoing, it may be appreciated that there continues to be a need for novel and improved devices and methods for presenting digital representations of materials via methods of physical simulation

SUMMARY OF THE INVENTION

The foregoing needs are met, to a great extent, by the present invention, wherein in aspects of this invention, enhancements are provided to the existing model of fabric and material presentation.

In an aspect, a product simulation and control system can include:
a) A product simulation and control server; and
b) A product simulation and control device;
wherein the product device can allow a user to browse catalogues of products, and review product information and interact with physical simulations of selected products.

In a related aspect, the product simulation and control device can be configured to show a plurality of rendered fabric/material rolls, which can be stacked on top of each other, in an endless/continuous stack, such that a user can scroll up or down in the continuous stack of rendered material rolls, by swiping up or down with a fingertip of the user.

In further related aspects, the material rolls can represent fabric rolls, sheet metal roll, yarn rolls, thread rolls, metal wire rolls, or other types of products and materials than can be rolled, and presented as a stack of rolls, to a consumer shopping for or wishing to review such products.

In a related aspect, the product simulation and control device can be configured with a content gesture to enable a user to do a right swipe on the roll navigation and scrolling window, such that a right swipe on a rendered material roll, causes the rendered material roll to be tagged as a favorite and added to the list of favorite material rolls, when the right swipe is completed.

In another related aspect, the product simulation and control device can be configured with a content gesture to enable a user to do a left swipe on the roll navigation and scrolling window, such that a left swipe on a rendered material roll, causes the rendered material roll to be tagged with a corresponding function tag, selected from a list of function tag options, when the left swipe is completed.

In a further related aspect, the product simulation and control device can be configured with a predetermined device scale factor, which scales/sizes the representation of the material representation on a screen of the product simulation and control device, which is a flat or substantially flat version of the roll rendering, such that the flat material rendering is shown with a normal size, in a 1:1 scale factor as compared to a physical sample of the material shown in the material rendering.

In yet a related aspect, the product simulation and control device can enable a user to do a right or left page swipe on a first material sample, to enable a user to flip from the first material sample to a second material sample, whereby the user can flip forward or rearward through pages of material samples.

In a further related aspect, the product simulator can calculate a sheet movement simulation, which models the physical movement of a first material sample during a right or left page swipe movement, such that the folding of the first material sample is modeled based on physical characteristics of the first material sample.

In a related aspect, the product simulator can further model the physical movement of a first material sample during a pinching movement (similar to a "zoom-out movement" with two fingers), and during a stretching movement (similar to a "zoom-in movement" with two fingers), such that the curvature and flexible movement of the first material sample is modeled based on physical characteristics of the first material sample.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 3 is a schematic diagram illustrating a product simulation and control device, according to an embodiment of the invention.

FIG. 4A is an illustration of a graphical user interface of the product simulation and control device, according to an embodiment of the invention.

FIG. 4B is an illustration of a graphical user interface of the product simulation and control device, according to an embodiment of the invention.

FIG. 8A is an illustration of a graphical user interface of the product simulation and control device, according to an embodiment of the invention.

FIG. 8B is an illustration of a graphical user interface of the product simulation and control device, according to an embodiment of the invention.

FIG. 10 is an illustration of a graphical user interface of the product simulation and control device, according to an embodiment of the invention.

FIG. 11 is a flowchart illustrating steps that may be followed, in accordance with one embodiment of a method or process of product simulation and control.

DETAILED DESCRIPTION

Figure 1:
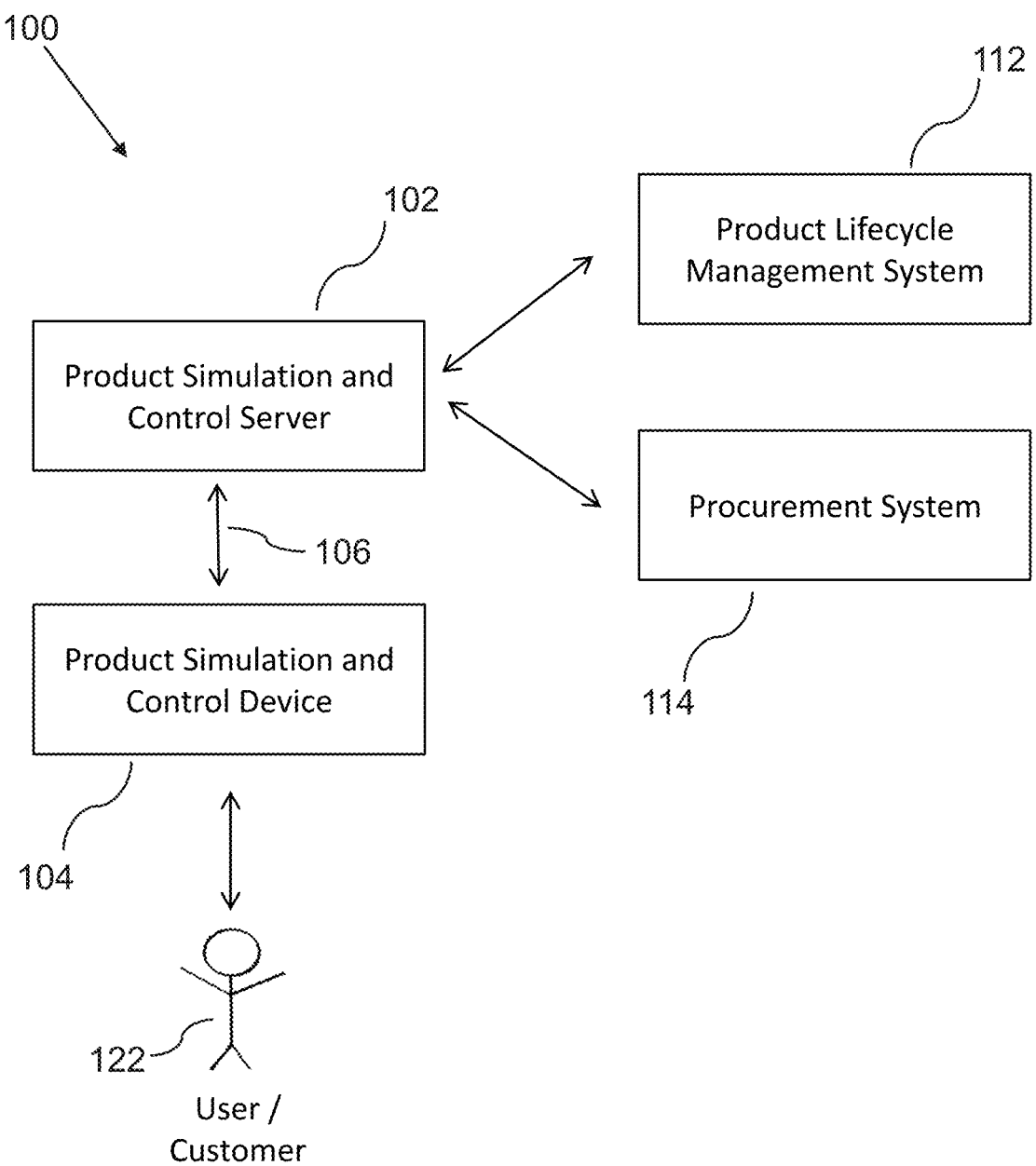
FIG. 1 is a schematic diagram illustrating a product simulation and control system, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of a digital asset control system 100 for navigation and interaction pertaining to physical asset equivalents, with reference to FIG. 1, in such manner that like reference numerals refer to like components throughout; a convention that we shall employ for the remainder of this specification.

In an embodiment a product simulation and control system 100 can include:
 a) a product simulation and control server 102; and
 b) a product simulation and control device 104;
  wherein the product simulation and control device 104 can allow a user 122 to browse catalogues of products, and review product information and interact with physical simulations of selected products.

In a related embodiment, a product simulation and control server 102 can include:
 a) A processor 202;
 b) A non-transitory memory 204;
 c) An input/output component 206; and
 d) A product storage 210, for storing product catalogues, including product information; all connected via
 e) A data bus 220.

In a related embodiment, a product simulation and control device 104 can include:
 a) A processor 302;
 b) A non-transitory memory 304;

c) An input/output 306;
d) A product browser 310;
e) A product simulator 312; and
f) A product classifier 314; all connected via
g) A data bus 320.

In related embodiments, the product simulation and control device 104 can include configurations as:
a) A web application, executing in a Web browser;
b) A tablet app, executing on a tablet device, such as for example an Android or iOS tablet device;
c) A mobile app, executing on a mobile device, such as for example an Android phone or iPhone, or any wearable mobile device;
d) A desktop application, executing on a personal computer, or similar device;
e) An embedded application, executing on a processing device, such as for example a smart TV, a game console or other system.

It shall be understood that an executing instance of an embodiment of the product simulation and control system 100, as shown in FIG. 1, can include a plurality of product simulation and control devices 104, which are each tied to one or more users 122.

An executing instance of an embodiment of the product simulation and control system 100, as shown in FIG. 1, can similarly include a plurality of product simulation and control servers 102.

In a related embodiment, FIG. 4A shows a roll navigation and scrolling windows 400a associated with the graphical user interface for the product simulation and control device 104, which can be configured in the product browser 310, which can be configured to:
a) show a plurality of rendered fabric/material rolls 412, which can be shown as stacked on top of each other, in an endless/continuous stack 410, such that a user can scroll up 422 or down 424 in the continuous stack 410 of rendered material rolls 412, by swiping up or down with a fingertip 450 of the user, wherein the product browser 310 renders the plurality of material rolls based on the product information, which is retrieved in communication with the product simulation and control server;
b) A back to main menu arrow 402, which when pressed by a user reverts back to a main menu;
c) A favorite button 404, for each rendered material roll 412, which favorite button 404 allows a user to add a rendered material roll 412 to a list of favorite material rolls 412;
d) A material name 406, for each rendered material roll 412, which material name 406 indicates the name of the material of the rendered material roll 412; and
e) A window header 408, including Display, filter, and search buttons 409.

In a related embodiment, FIG. 4B shows the roll navigation and scrolling windows 400b after the user has scrolled downwards in the continuous stack 410, starting from the roll navigation and scrolling windows 400a.

Figure 4C:
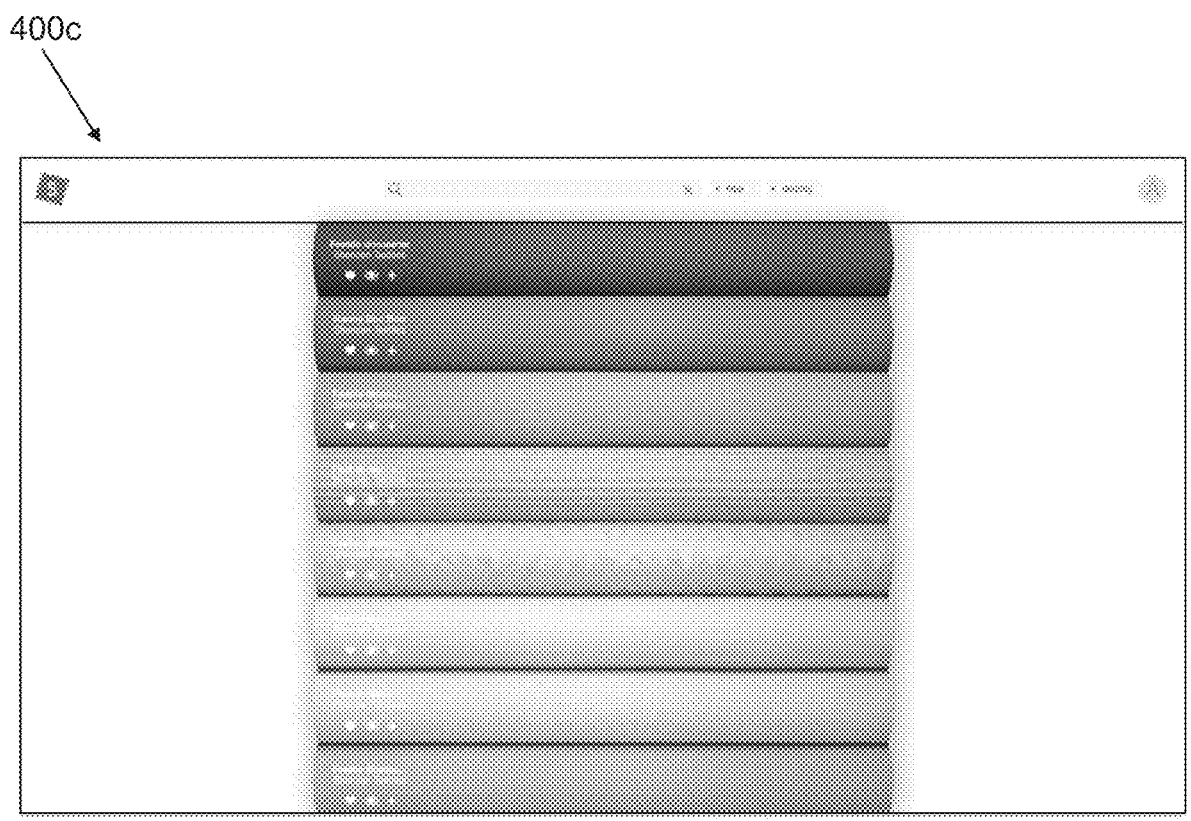
FIG. 4C is an illustration of a graphical user interface of the product simulation and control device, according to an embodiment of the invention.

In a related embodiment, FIG. 4C shows the roll navigation and scrolling windows 400c configured for use in a web browser/desktop application.

Figure 4D:
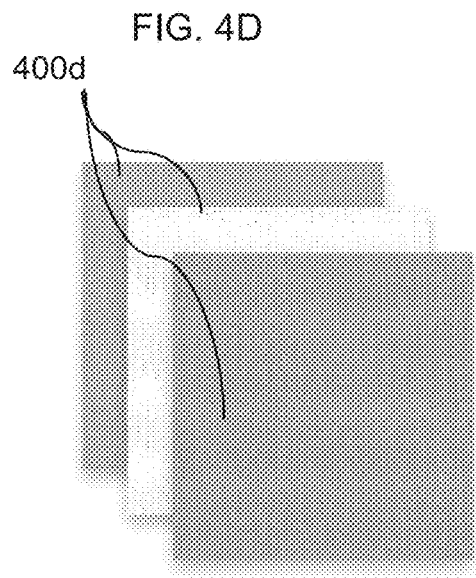
FIG. 4D is an illustration of digital fabric samples of the product simulation and control device, according to an embodiment of the invention.
Figure 4E:
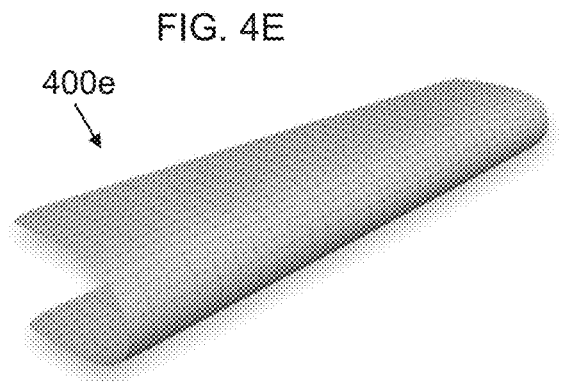
FIG. 4E is a perspective view of a digital roll mesh of the product simulation and control device, according to an embodiment of the invention.
Figure 4F:
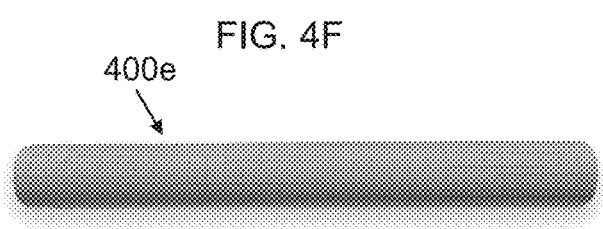
FIG. 4F is a front view of a digital roll mesh of the product simulation and control device, according to an embodiment of the invention.
Figure 4G:
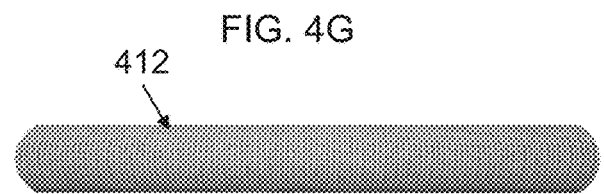
FIG. 4G is a front view of a single digital roll rendering of the product simulation and control device, according to an embodiment of the invention.
Figure 4H:
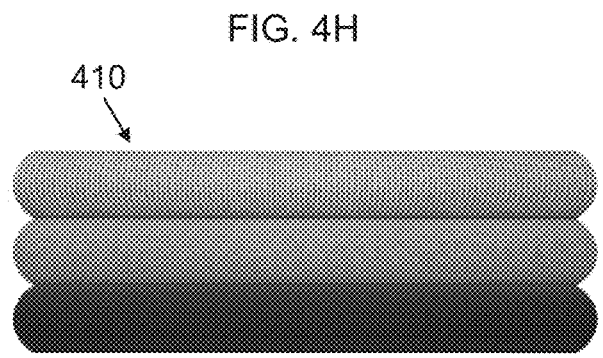
FIG. 4H is a front view of a plurality of digital roll renderings of the product simulation and control device, according to an embodiment of the invention.
Figure 4I:
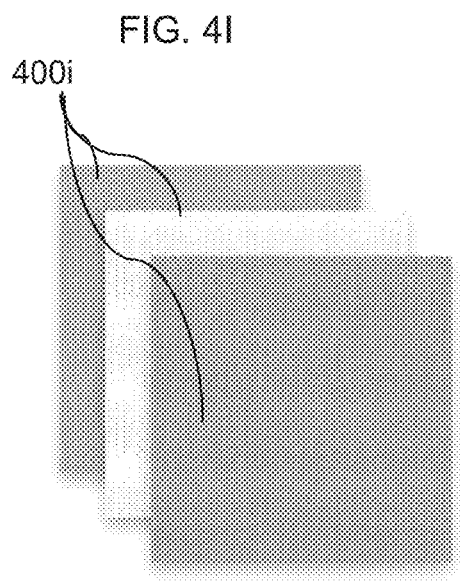
FIG. 4I is an illustration of physical fabric samples, according to an embodiment of the invention.

In a related embodiment, the product simulator 312 of the product simulation and control device 104 can be configured to store a digital fabric/material representations 400d of physical fabric/material samples 400i, as shown in FIGS. 4D and 4I, which can be high-precision scans of physical fabric samples/swatches, such that the product simulator stores a digital material representation for each product in the catalogues of products, such that the digital material representation is based on a high-precision scan of a physical material sample 400i.

In a related embodiment, the product simulator 312 of the product simulation and control device 104 can be configured to generate a representation of a roll mesh 400e, as shown in FIG. 4E in a perspective view, and in FIG. 4F in a front view.

In a related embodiment, the product simulator 312 of the product simulation and control device 104 can be configured to overlay the digital material representation 400d onto the roll mesh representation 400e, in order to generate a digital roll rendering 412, as shown in FIG. 4G, in a front view, such that the digital roll rendering 412 can be viewed by the user 122. The product simulator 312 can be configured to generate views with lighting shadowing and depth of field, to simulate the appearance of a physical material roll.

In a related embodiment, the product simulator 312 of the product simulation and control device 104, can be configured to generate a view of an endless/continuous stack 410 of a plurality of rendered fabric/material rolls 412.

In related embodiments, the material rolls 412 can represent fabric rolls, sheet metal roll, yarn rolls, thread rolls, metal wire rolls, or other types of products and materials that can be rolled, and presented as a stack of rolls 412, to a consumer shopping for such products.

Figure 5A:
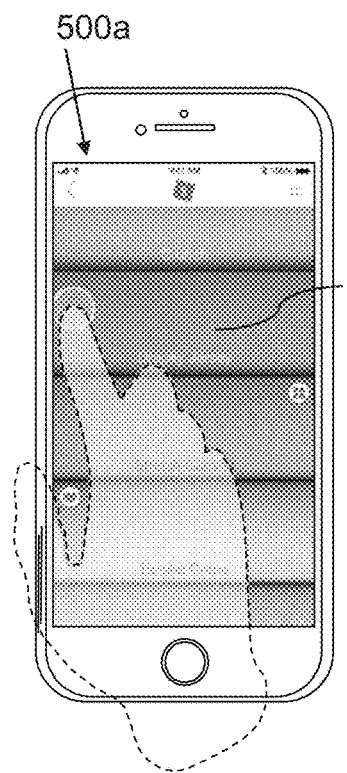
FIG. 5A is an illustration of a graphical user interface of the product simulation and control device, according to an embodiment of the invention.
Figure 5B:
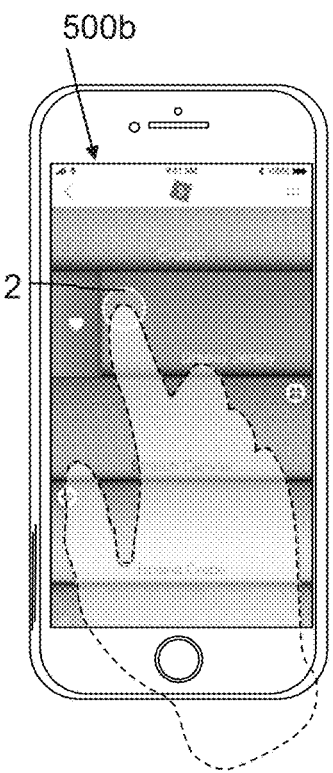
FIG. 5B is an illustration of a graphical user interface of the product simulation and control device, according to an embodiment of the invention.
Figure 5C:
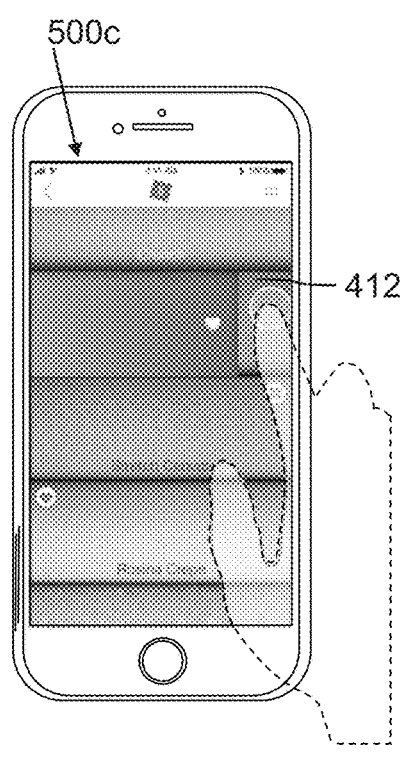
FIG. 5C is an illustration of a graphical user interface of the product simulation and control device, according to an embodiment of the invention.

In a related embodiment, the product browser 310 can be configured with a content gesture to enable a user to do a right swipe on the roll navigation and scrolling window 400a, as shown in FIGS. 5A, 5B, and 5C, showing the sequential states of the roll navigation and scrolling window 500a 500b 500c, such that a right swipe on a rendered material roll 412, causes the rendered material roll 412 to be tagged as a favorite and added to the list of favorite material rolls 412, when the right swipe is completed, as shown in FIG. 5C.

Figure 6A:
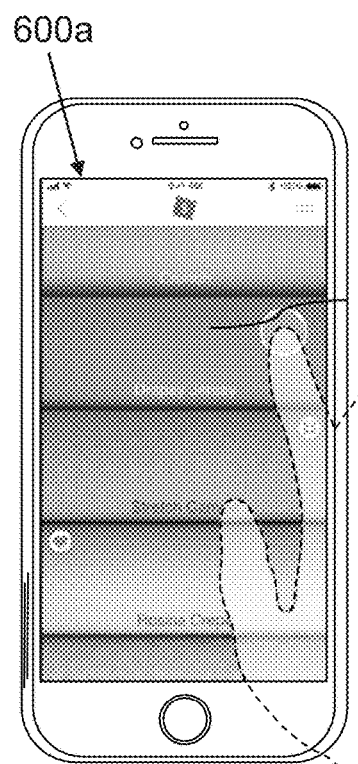
FIG. 6A is an illustration of a graphical user interface of the product simulation and control device, according to an embodiment of the invention.
Figure 6B:
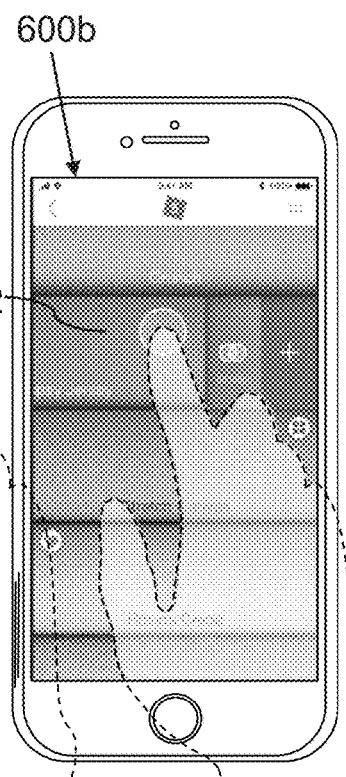
FIG. 6B is an illustration of a graphical user interface of the product simulation and control device, according to an embodiment of the invention.
Figure 6C:
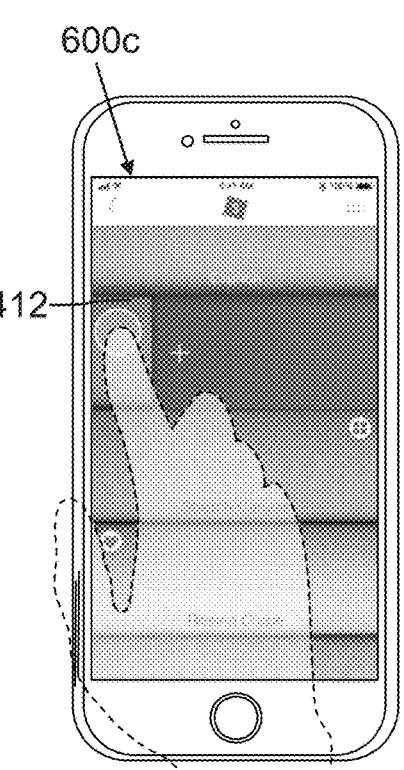
FIG. 6C is an illustration of a graphical user interface of the product simulation and control device, according to an embodiment of the invention.

In another related embodiment, the product browser 310 can be configured with a content gesture to enable a user to do a left swipe on the roll navigation and scrolling window 400a, as shown in FIGS. 6A, 6B, and 6C, showing the sequential states of the roll navigation and scrolling window 600a 600b 600c, such that a left swipe on a rendered material roll 412, causes the rendered material roll 412 to be tagged with a corresponding function tag, selected from a list of function tag options, when the left swipe is completed, as shown in FIG. 6C.

Figure 7A:
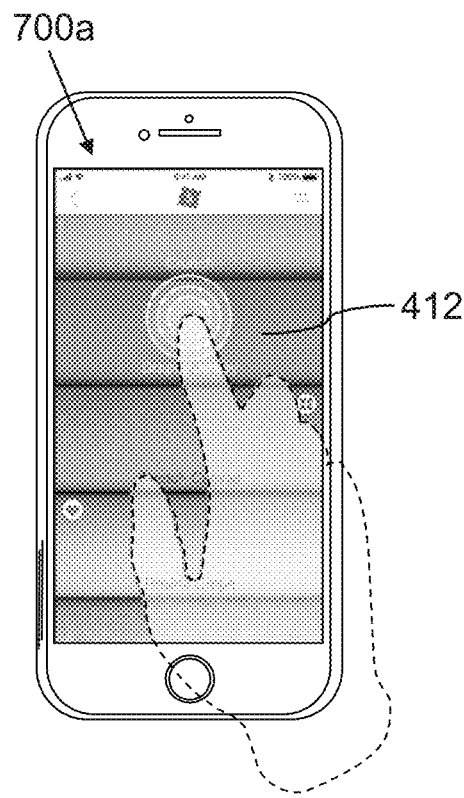
FIG. 7A is an illustration of a graphical user interface of the product simulation and control device, according to an embodiment of the invention.
Figure 7B:
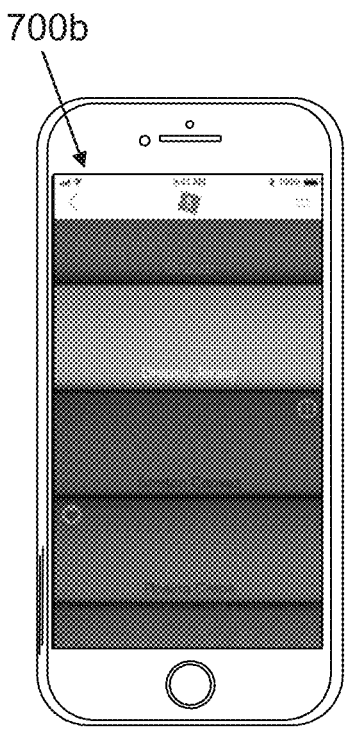
FIG. 7B is an illustration of a graphical user interface of the product simulation and control device, according to an embodiment of the invention.
Figure 7C:
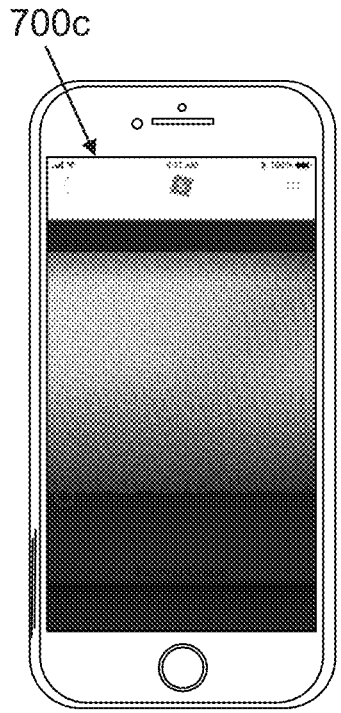
FIG. 7C is an illustration of a graphical user interface of the product simulation and control device, according to an embodiment of the invention.
Figure 7D:
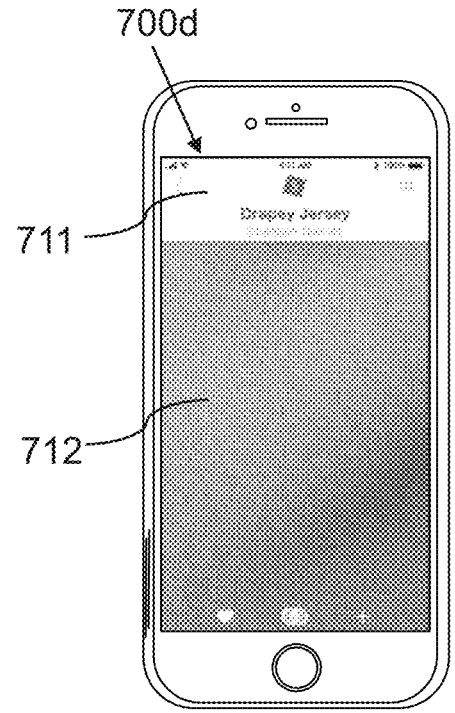
FIG. 7D is an illustration of a graphical user interface of the product simulation and control device, according to an embodiment of the invention.

In further related embodiments, a right or left swipe can be related to other functions, including add to a collection, share swatch with others, order swatch or sample or swatch from supplier, remove swatch from collection, find similar swatches and contact supplier. A right or left swipe can be completed for a shortcut type gesture, but also done halfway to reveal multi options on which the user can press to access In yet a related embodiment, as shown in FIGS. 7A-7D, the product browser 310 can be configured to enable a user to press on a rendered material roll 412, as shown in FIG. 7A, such that the product browser shows a transition from the product roll stack view 700a, via intermediate views 700b 700c, as shown in FIGS. 7B and 7C, to reach a final state, showing a flat rendering of a material sample 700d (also referred to as a material swatch sample 700d), of the material/fabric corresponding to the rendered material roll 412, including a material swatch header 711 and a material swatch rendering 712.

Thus, in a further related embodiment, the product browser 310 can be configured to show a transition from the digital roll rendering 412 to a flat material swatch sample 700d corresponding to the digital roll rendering 412, when the user selects the digital roll rendering from the plurality of rendered material rolls.

Thus, in a yet further related embodiment, the flat material swatch sample 700d can include a material swatch header 711 and a material swatch rendering 712.

In a further related embodiment, the product simulator 312 can be configured with a predetermined device scale factor, which scales/sizes the representation of the material representation/material swatch rendering 712 on a screen 308 of the product simulation and control device 104, which is a flat or substantially flat version of the roll rendering 412, such that the flat material rendering 712 is shown with a normal size, in a 1:1 scale factor as compared to a physical sample of the material shown in the material rendering 712.

Thus, in a yet further related embodiment, the product simulator 312 can be configured with a predetermined device scale factor, which scales a representation of the material swatch rendering 712 on a screen 308 of the product simulation and control device 104, such that the product simulator 312 is configured to show the material swatch rendering 712 with a normal size with a 1:1 scale factor in relation to the physical material sample 400i, by resizing the representation of the material swatch rendering 712 with the predetermined device scale factor.

In yet a related embodiment, as shown in FIGS. 8A and 8B, the product simulator 312 can be configured to enable a user to do a right page swipe on a first material sample 800a, to enable a user to flip from the first material sample 800a to a second material sample 800b, whereby the user can flip forward through pages. Similarly, the product simulator 312 can be configured to enable a user to do a left page swipe on a second material sample 800b, to enable a user to flip from the second material sample 800b to the first material sample 800a, whereby the user can flip rearward through pages/sheets of material samples.

In a related embodiment, the product simulator 312 can be configured to calculate a sheet movement simulation, which models the physical movement of a first material sample 800a during a right or left page swipe movement, such that the folding of the first material sample 800a is modeled based on physical characteristics of the first material sample 800a, which can include density, vertical (i.e. warp), horizontal (i.e. weft), and diagonal (i.e. shear) elasticity, and vertical, horizontal, and diagonal bending coefficients, using well-known methods from cloth or sheet modeling within a gravitational/physical calculation engine. The cloth or sheet modeling can be based on geometric, physical, or particle models, that model the connection structure of the fabric or material. In other related embodiments, a right or left swipe can solely slide the first material sample 800a right or left without folding, to visually simulate sliding a swatch 800a of the stack of swatches 800a.

Figure 9A:
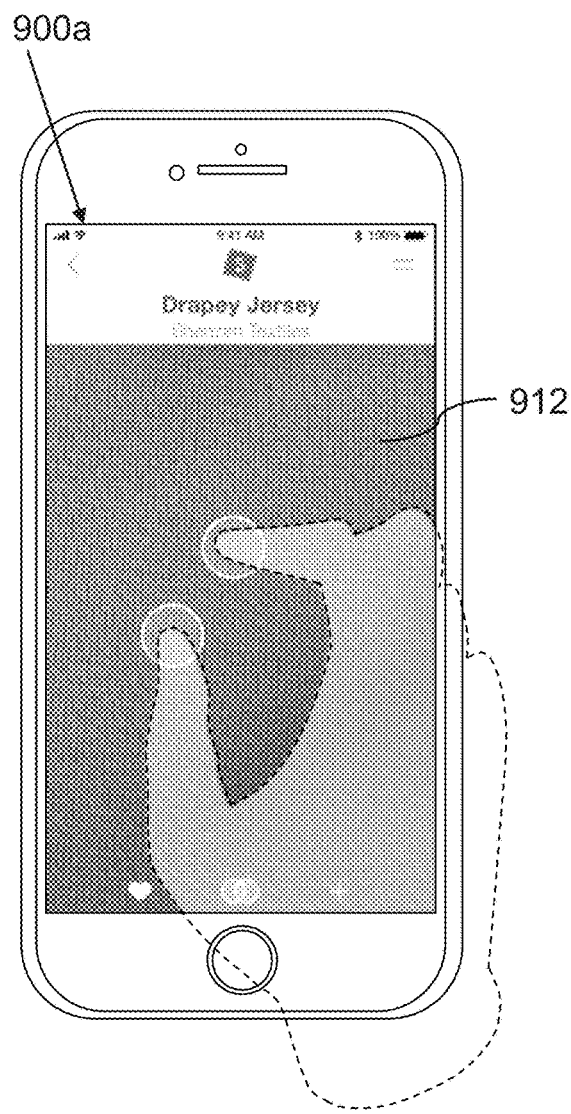
FIG. 9A is an illustration of a graphical user interface of the product simulation and control device, according to an embodiment of the invention.
Figure 9B:
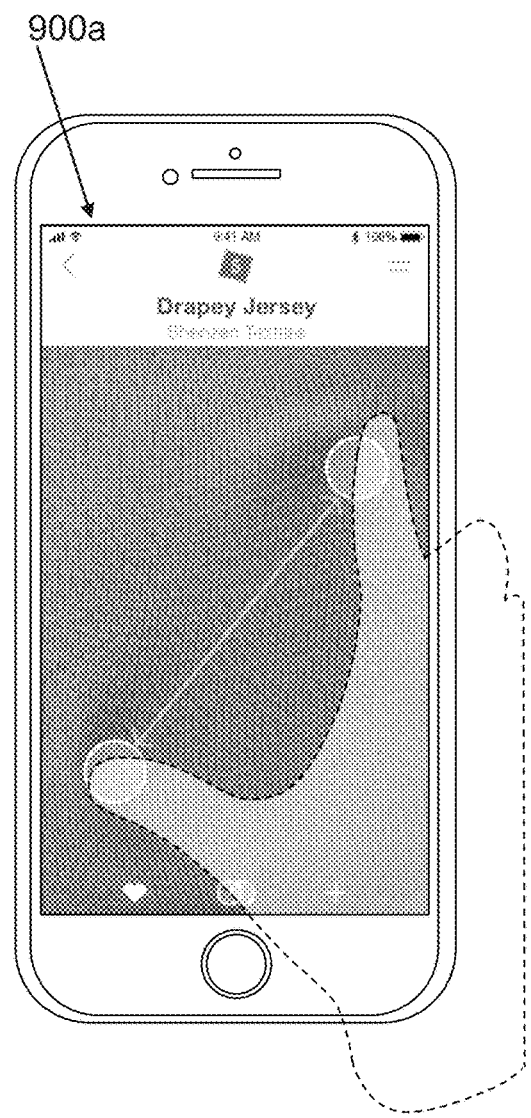
FIG. 9B is an illustration of a graphical user interface of the product simulation and control device, according to an embodiment of the invention.

In a related embodiment, as shown in FIGS. 9A and 9B, the product simulator can be further configured such that the sheet movement simulation further models the physical movement of a material swatch rendering 912 of a first material sample 900a during a pinching movement (similar to a "zoom-out movement") with two fingers of the user 122, as shown in FIG. 9A, and during a stretching movement (similar to a "zoom-in movement") with two fingers of the user 122, as shown in FIG. 9B, such that the curvature and flexible movement of the material swatch rendering 912 is modeled based on physical characteristics of the first material sample 900a.

In a related embodiment, as shown in FIG. 10, the product simulator can be further configured such that the sheet movement simulation further models the draping of a of a material swatch rendering 912 of a material sample 900a on an object 1010, such as a sphere 1010, such that the curvature and flexible movement of the material swatch rendering 912 is modeled based on physical characteristics of the first material sample 700d. The sheet movement simulation can further model and show that the material swatch rendering 912 falls and floats down, starting from a flat horizontal configuration, and ends up hitting/impacting with the object/sphere 1010 and being draped on the object/sphere 1010. The sheet movement simulation can further model that the object/sphere 1010 is rotated 1082, with the material swatch rendering 912 draped on the object/sphere 1010, such that the material swatch rendering 912 is simulated to rotate and lift 1084, to show how the material swatch rendering 912 behaves under impact of various forces.

In another related embodiment, the product simulator 312 can be configured to enable a user to associate a material sample 700d with descriptive tags, to indicate material properties. Such tags can for example include: "fluffy", "wrinkly", "satin-like", "airy", "light", "heavy", and other descriptive tags.

In another related embodiment, the product classifier 314 can be configured to use a machine learning algorithm to calculate a product classification function based on analysis of stored material samples 700d with their associated tags, such that the machine learning algorithm optimizes the product classification function to map a test material sample 700d, the physical characteristics of the test material sample 700d, and a test tag to an association confidence, which for example can be real number in a range from 0 to 1, such that 0 indicates that the tag does not describe the test material sample 700d, and 1 indicates a 100% probability that the tag describes the test material sample 700d.

In further related embodiments, the machine learning algorithm can use well-known methods of machine learning, including artificial neural networks, such as deep learning feed-forward neural networks with back-propagation learning; genetic algorithms; support vector machines; and cluster classification.

In a further related embodiment, the machine learning algorithm can be a convolutional artificial neural network with at least two hidden layers, such that the product classification function is implemented by the optimized/trained convolutional artificial neural network, which can be trained/optimized using well-known artificial neural network deep learning methods, including backpropagation and other non-linear function optimization methods. In many related embodiments, learning/training can be unsupervised, in order to ensure hidden/unknown rating bias is found/incorporated, but in some embodiments, learning may be supervised or partially supervised, and may employ reinforcement learning.

In a further related embodiment, the product classification function can be a convolutional artificial neural network with at least two hidden layers, wherein the convolutional artificial neural network is trained over the stored material samples 700d with their associated tags, by using a deep learning method, such as backpropagation or other function optimization methods, including newton's method, quasi-newton methods, gradient descent, etc.

In another related embodiment, the product simulation and control device 104 can further include a haptic screen 316, that is configured to adapt to a surface texture of a material sample 700*d* shown on the haptic screen 316, such that a user can sense the surface texture by touching the haptic screen 316.

In yet another related embodiment, the product simulation and control device 104 can further include a haptic feedback component 318, such as the vibration system of a smart phone 104 or other digital device 104, such that the haptic feedback component 318 is configured to emulate or indicate a surface texture of a material sample 700*d* shown on a conventional touch screen of the product simulation and control device 104, such that a user can sense the surface texture by touching the conventional screen, for example such that a smooth surface area of the material sample 700*d* provides a high frequency/low amplitude vibration and a rougher surface area provides a lower frequency and more powerful vibration of the product simulation and control device 104.

In a related embodiment, the product simulation and control system 100 can further include a product life cycle system 112, such that the product simulation and control server 102 communicates with the product life cycle system 112 to receive and store product information.

In another related embodiment, the product simulation and control system 100 can further include a procurement system 114, such that the product simulation and control server 102 communicates with the procurement system 114 to place orders for materials.

In an embodiment, as illustrated in FIG. 11, a method for product simulation and control 1100, can include:

a) Browsing products 1102, wherein a user scrolls up 422 or down 424 in a continuous stack 410 of rendered material rolls 412, by swiping up or down with a fingertip 450 of the user;

b) Favoriting a product 1104, wherein the user right (or alternatively left) swipes on the roll navigation and scrolling window 400*a*, as shown in FIGS. 5A, 5B, and 5C, such that a right swipe on a rendered material roll 412, causes the rendered material roll 412 to be tagged as a favorite and added to the list of favorite material rolls 412, when the right swipe is completed, as shown in FIG. 5C;

c) Tagging a product 1106, wherein the user left (or alternatively right) swipes on the roll navigation and scrolling window 400*a*, as shown in FIGS. 6A, 6B, and 6C, such that a left swipe on a rendered material roll 412, causes the rendered material roll 412 to be tagged with a corresponding function tag, selected from a list of function tag options, when the left swipe is completed, as shown in FIG. 6C. Alternatively, the user can be prompted to type a tag, once the left swipe is completed.

d) Selecting a product 1108, wherein a user presses on a rendered material roll 412, as shown in FIG. 7A, whereby the product browser shows a transition from the product roll stack view, via intermediate views, as shown in FIGS. 7B and 7C, to reach a final state, showing a flat rendering of a material sample 700*d* or material swatch 700*d*, of the material/fabric corresponding to the rendered material roll 412, including a material/swatch header 711 and a material/swatch rendering 712;

e) Page browsing 1110, wherein the user can do a right or left page swipe on a first material sample 700*d*, to enable the user to flip from a first material sample 700*d* to a second material sample 800*b*, whereby the user can flip forward or backward through pages. This can include modeling the physical movement of a first material sample 700*d* during a right or left page swipe movement, such that the folding of the first material sample 700*d* is modeled based on physical characteristics of the first material sample 700*d*, which can include density, vertical (i.e. warp), horizontal (i.e. weft), and diagonal (i.e. shear) elasticity, and vertical, horizontal, and diagonal bending coefficients, using well-known methods from cloth or sheet modeling within a gravitational/physical calculation engine. In other related embodiments, a right or left swipe can solely slide the first material sample 700*d* right or left without folding, to visually simulate sliding a swatch 700*d* of the stack of swatches 700*d*;

f) Pinching product 1112, including modeling the physical movement of a first material sample 700*d* during a pinching movement (similar to a "zoom-out movement" with two fingers), as shown in FIG. 9A, such that the curvature and flexible movement of the first material sample 700*d* is modeled based on the physical characteristics of the first material sample 700*d*;

g) Stretching product 1114, including modeling the physical movement of a first material sample 700*d* during a stretching movement (similar to a "zoom-in movement" with two fingers), as shown in FIG. 9B, such that the curvature and flexible movement of the first material sample 700*d* is modeled based on physical characteristics of the first material sample 700*d*;

h) Simulating product movement 1116, including modeling the draping of a material sample 700*d* on a sphere (or other object such as a virtual mannequin), such that the curvature and flexible movement of the first material sample 700*d* is modeled based on physical characteristics of the first material sample 700*d*. The sheet movement simulation can further model and show that the material sample 700*d* falls and floats down, starting from a flat horizontal configuration, and ends up hitting the sphere and being draped on the sphere. The sheet movement simulation can further model that the sphere is rotated, such that the material sample 700*d* starts to rotate and lift, to show how the material sample 700*d* behaves under impact of various forces.

FIGS. 1, 2, 3 and 11 are block diagrams and flowcharts, methods, devices, systems, apparatuses, and computer program products according to various embodiments of the present invention. It shall be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus or system according to the present invention can include other means, such as hardware or some combination of hardware and software, including one or more processors or controllers, for performing the disclosed functions.

Figure 2:
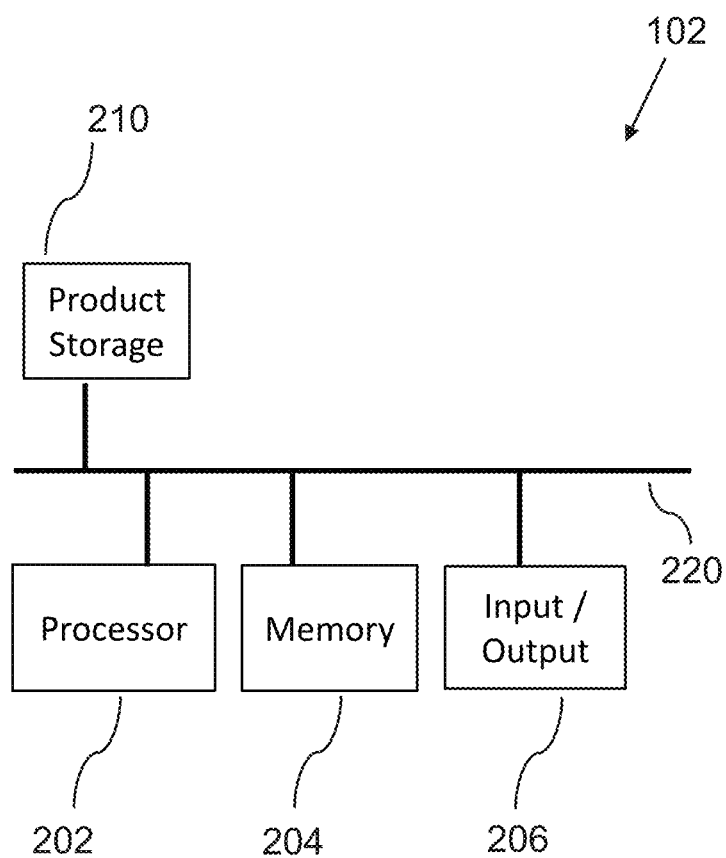
FIG. 2 is a schematic diagram illustrating a product simulation and control server, according to an embodiment of the invention.

In this regard, FIGS. 1, 2, and 3 depict the computer devices of various embodiments, each containing several of the key components of a general-purpose computer by which an embodiment of the present invention may be implemented. Those of ordinary skill in the art will appreciate that a computer can include many components. However, it is not necessary that all of these generally conventional components be shown in order to disclose an illustrative embodiment for practicing the invention. The general-purpose computer can include a processing unit and a system memory, which may include various forms of non-transitory storage media such as random access memory (RAM) and read-only memory (ROM). The computer also may include nonvolatile storage memory, such as a hard disk drive, where additional data can be stored.

FIG. 1 shows a depiction of an embodiment of the product simulation and control system 100, including the product simulation and control server 102, and the product simulation and control device 104. In this relation, a server shall be understood to represent a general computing capability that can be physically manifested as one, two, or a plurality of individual physical computing devices, located at one or several physical locations. A server can for example be manifested as a shared computational use of one single desktop computer, a dedicated server, a cluster of rack-mounted physical servers, a datacenter, or network of datacenters, each such datacenter containing a plurality of physical servers, or a computing cloud, such as AMAZON EC2™ or MICROSOFT AZURE™.

It shall be understood that the above-mentioned components of the product simulation and control server 102 and the product simulation and control device 104 are to be interpreted in the most general manner.

For example, the processors 202 302 can each respectively include a single physical microprocessor or microcontroller, a cluster of processors, a datacenter or a cluster of datacenters, a computing cloud service, and the like.

In a further example, the non-transitory memory 204 and the non-transitory memory 304 can each respectively include various forms of non-transitory storage media, including random access memory and other forms of dynamic storage, and hard disks, hard disk clusters, cloud storage services, and other forms of long-term storage. Similarly, the input/output 206 and the input/output 306 can each respectively include a plurality of well-known input/output devices, such as screens, keyboards, pointing devices, motion trackers, communication ports, and so forth.

Furthermore, it shall be understood that the product simulation and control server 102 and the product simulation and control device 104 can each respectively include a number of other components that are well known in the art of general computer devices, and therefore shall not be further described herein. This can include system access to common functions and hardware, such as for example via operating system layers such as WINDOWS™, LINUX™, and similar operating system software, but can also include configurations wherein application services are executing directly on server hardware or via a hardware abstraction layer other than a complete operating system.

An embodiment of the present invention can also include one or more input or output components, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

In a related embodiment, the product simulation and control device 104 communicates with the product simulation and control server 102 over a network 106, which can include the general Internet, a Wide Area Network or a Local Area Network, or another form of communication network, transmitted on wired or wireless connections. Wireless networks can for example include Ethernet, Wi-Fi, BLUETOOTH™, ZIGBEE™, and NFC. The communication can be transferred via a secure, encrypted communication protocol.

Typically, computer program instructions may be loaded onto the computer or other general-purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

Here has thus been described a multitude of embodiments of the product simulation and control system 100, the product simulation and control device 104, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

For example, alternative embodiments can reconfigure or combine the components of the product simulation and control server 102 and the product simulation and control device 104. The components of the product simulation and control server 102 can be distributed over a plurality of physical, logical, or virtual servers. Parts or all of the components of the product simulation and control device 104 can be configured to operate in the product simulation and control server 102, whereby the product simulation and control device 104 for example can function as a thin client, performing only graphical user interface presentation and input/output functions. Alternatively, parts or all of the components of the product simulation and control server 102 can be configured to operate in the product simulation and control device 104.

Many such alternative configurations are readily apparent, and should be considered fully included in this specification and the claims appended hereto. Accordingly, since numerous modifications and variations will readily occur to those skilled in the art, the invention is not limited to the exact construction and operation illustrated and described, and thus, all suitable modifications and equivalents may be resorted to, falling within the scope of the invention.

What is claimed is:

1. A product simulation and control system, comprising:
a) a product simulation and control server; and
b) a product simulation and control device, which comprises a product simulator;
wherein the product simulation and control device is configured to allow a user to browse catalogues of products, and review product information and interact with physical simulations of selected products;
wherein the product simulator is configured to store a digital material representation for each product in the catalogues of products, such that the digital material representation is based on a high-precision scan of a physical material sample;
wherein the product simulator is configured to:
enable the user to do a right page swipe on a first material sample, such that the product simulator transitions from showing the first material sample to showing a second material sample; and
enable the user to do a left page swipe on the second material sample, such that the product simulator transitions from showing the second material sample to showing the first material sample;
wherein the product simulator is configured with a predetermined device scale factor, which scales a representation of a material swatch rendering of a material sample on a screen of the product simulation and control device, such that the product simulator is configured to show the material swatch rendering with a normal size with a 1:1 scale factor in relation to the physical material sample, by resizing the representation of the material swatch rendering with the predetermined device scale factor; and
wherein the product simulator is configured to calculate a sheet movement simulation, which models a physical movement of the first material sample during the right and left page swipe movements, such that the folding of the first material sample is modeled based on physical characteristics of the first material sample, using a method of sheet modeling within a gravitational and physical calculation engine.

2. The product simulation and control system of claim 1, wherein the product simulation and control server further comprises:
a) a processor;
b) a non-transitory memory;
c) an input/output component; and
d) a product storage, which is configured to store the catalogues, including the product information; all connected via
e) a data bus.

3. The product simulation and control system of claim 1, wherein the product simulation and control device further comprises:
a) a processor;
b) a non-transitory memory;
c) an input/output component; and
d) a product browser; all connected via
e) a data bus;
wherein the product browser is configured to show a plurality of rendered material rolls, which are shown as stacked on top of each other, in a continuous stack of material rolls, such that the product browser is configured to allow the user to scroll up or down in the continuous stack, by swiping up or down with a fingertip of the user;
wherein the product browser is configured to render the plurality of material rolls based on the product information, which is retrieved in communication with the product simulation and control server.

4. The product simulation and control system of claim 1, wherein the product simulator is configured to generate a representation of a roll mesh.

5. The product simulation and control system of claim 4, wherein the product simulator is configured to overlay the digital material representation onto the roll mesh representation, in order to generate a digital roll rendering.

6. The product simulation and control system of claim 5, wherein the product simulator is configured to generate views of the digital roll rendering with lighting shadowing and depth of field added, to simulate the appearance of a physical material roll.

7. The product simulation and control system of claim 5, wherein the product browser is configured to show a transition from the digital roll rendering to a material sample corresponding to the digital roll rendering, when the user selects the digital roll rendering from the plurality of rendered material rolls.

8. The product simulation and control system of claim 7, wherein the first material sample comprises a material swatch header and a material swatch rendering.

9. The product simulation and control system of claim 1, wherein the physical characteristics include density; vertical, horizontal, and diagonal elasticity; and vertical, horizontal, and diagonal bending coefficients.

10. The product simulation and control system of claim 1, wherein the product simulator is further configured to model a physical movement of a material swatch rendering of a material sample during a pinching movement with two fingers of the user; and during a stretching movement with the two fingers; such that the curvature and flexible movement of the material swatch rendering is modeled based on physical characteristics of the material sample, using a method of sheet modeling within a gravitational and physical calculation engine.

11. The product simulation and control system of claim 1, wherein the product simulator is further configured to model a draping of a material swatch rendering of a material sample on an object, such that the curvature and flexible movement of the material swatch rendering is modeled based on physical characteristics of the material sample, using a method of sheet modeling within a gravitational and physical calculation engine.

12. The product simulation and control system of claim 11, wherein the product simulator is further configured to model and show that the material swatch rendering falls and floats down, starting from a flat horizontal configuration, such that the material swatch rendering impacts with the object and is draped on the object.

13. The product simulation and control system of claim 11, wherein the product simulator is further configured to model that the object is rotated with the material swatch rendering draped on the object, such that the material swatch rendering is simulated to rotate and lift, to show how the material swatch rendering behaves under impact of forces.

14. The product simulation and control system of claim 1, wherein the product simulator is configured to enable a user to associate a material sample with a plurality of descriptive tags, to indicate material properties.

15. The product simulation and control system of claim 14, wherein the product simulation and control device further comprises:
a product classifier;
wherein the product classifier is configured to use a machine learning algorithm to calculate a product classification function based on analysis of stored material samples with associated tags, such that the machine learning algorithm optimizes the product classification function to map the material sample, physical characteristics of the first material sample, and a test descriptive tag of the plurality of descriptive tags to an association confidence.

16. The product simulation and control system of claim 15, wherein the machine learning algorithm is a convolutional artificial neural network with at least two hidden layers, such that the product classification function is implemented by a trained convolutional artificial neural network, which is trained using a non-linear function optimization method.

17. A product simulation and control device, comprising:
a) a processor;
b) a non-transitory memory;
c) an input/output component;
d) a product browser; and
e) a product simulator; all connected via
f) a data bus;
wherein the product simulation and control device is configured to allow a user to browse catalogues of products, and review product information and interact with physical simulations of selected products;
wherein the product simulator is configured to store a digital material representation for each product in the catalogues of products, such that the digital material representation is based on a high-precision scan of a physical material sample;
wherein the product simulator is configured with a predetermined device scale factor, which scales a representation of a material swatch rendering of a material sample on a screen of the product simulation and control device, such that the product simulator is configured to show the material swatch rendering with a normal size with a 1:1 scale factor in relation to the physical material sample, by resizing the representation of the material swatch rendering with the predetermined device scale factor; and
wherein the product simulator is further configured to model a physical movement of the material swatch rendering of the material sample during a pinching movement with two fingers of the user; and during a stretching movement with the two fingers; such that the curvature and flexible movement of the material swatch rendering is modeled based on physical characteristics of the material sample, using a method of sheet modeling within a gravitational and physical calculation engine.

18. The product simulation and control device of claim 17,
wherein the product simulator is configured to generate a representation of a roll mesh;
wherein the product simulator is configured to overlay the digital material representation onto the roll mesh representation, in order to generate a digital roll rendering.

19. The product simulation and control device of claim 18, wherein the product browser is configured to show a transition from the digital roll rendering to a first material sample corresponding to the digital roll rendering, when the user selects the digital roll rendering from the plurality of rendered material rolls.

20. The product simulation and control device of claim 18, wherein the product simulator is configured to:
a) enable the user to do a right page swipe on a first material sample, such that the product browser transitions from showing the first material sample to showing a second material sample; and
b) enable the user to do a left page swipe on the second material sample, such that the product browser transitions from showing the second material sample to showing the first material sample.

21. The product simulation and control system of claim 20, wherein the product simulator is configured to calculate a sheet movement simulation, which models the physical movement of the first material sample during the right and left page swipe movements, such that the folding of the first material sample is modeled based on physical characteristics of the first material sample, using a method of sheet modeling within a gravitational and physical calculation engine.

22. A product simulation and control system, comprising:
a product simulation and control device, which comprises
a product simulator; and
a product classifier;
wherein the product simulation and control device is configured to allow a user to browse catalogues of products, and review product information and interact with physical simulations of selected products;
wherein the product simulator is configured to store a digital material representation for each product in the catalogues of products, such that the digital material representation is based on a high-precision scan of a physical material sample;
wherein the product simulator is configured to enable a user to associate a material sample with a plurality of descriptive tags, to indicate material properties; and
wherein the product classifier is configured to use a machine learning algorithm to calculate a product classification function based on analysis of stored material samples with associated tags, such that the machine learning algorithm optimizes the product classification function to map the material sample, physical characteristics of the first material sample, and a test descriptive tag of the plurality of descriptive tags to an association confidence.

23. The product simulation and control system of claim 22, wherein the product simulator is configured with a predetermined device scale factor, which scales a representation of a material swatch rendering of a material sample on a screen of the product simulation and control device, such that the product simulator is configured to show the material swatch rendering with a normal size with a 1:1 scale factor in relation to the physical material sample, by resizing the representation of the material swatch rendering with the predetermined device scale factor.

24. The product simulation and control system of claim 22, wherein the product simulator is configured to:
- enable the user to do a right page swipe on a first material sample, such that the product simulator transitions from showing the first material sample to showing a second material sample; and
- enable the user to do a left page swipe on the second material sample, such that the product simulator transitions from showing the second material sample to showing the first material sample;

wherein the product simulator is configured to calculate a sheet movement simulation, which models a physical movement of the first material sample during the right and left page swipe movements, such that the folding of the first material sample is modeled based on physical characteristics of the first material sample, using a method of sheet modeling within a gravitational and physical calculation engine.

25. The product simulation and control system of claim 22, wherein the product simulator is further configured to model a physical movement of a material swatch rendering of a material sample during a pinching movement with two fingers of the user; and during a stretching movement with the two fingers;
- such that the curvature and flexible movement of the material swatch rendering is modeled based on physical characteristics of the material sample, using a method of sheet modeling within a gravitational and physical calculation engine.

* * * * *